United States Patent
Krishnan et al.

(10) Patent No.: US 9,053,238 B2
(45) Date of Patent: Jun. 9, 2015

(54) TOOL-INDEPENDENT AUTOMATED TESTING OF SOFTWARE

(71) Applicant: International Business Machines Corporation, Armonk, NY (US)

(72) Inventors: Prakash Krishnan, Bangalore (IN); Varun Ojha, Panchkula (IN)

(73) Assignee: International Business Machines Corporation, Armonk, NY (US)

(*) Notice: Subject to any disclaimer, the term of this patent is extended or adjusted under 35 U.S.C. 154(b) by 128 days.

(21) Appl. No.: 13/750,144

(22) Filed: Jan. 25, 2013

(65) Prior Publication Data

US 2014/0215439 A1 Jul. 31, 2014

(51) Int. Cl.
*G06F 9/44* (2006.01)
*G06F 11/36* (2006.01)

(52) U.S. Cl.
CPC ........ *G06F 11/3688* (2013.01); *G06F 11/3664* (2013.01)

(58) Field of Classification Search
None
See application file for complete search history.

(56) References Cited

U.S. PATENT DOCUMENTS

| | | | | |
|---|---|---|---|---|
| 5,475,843 | A * | 12/1995 | Halviatti et al. | 717/124 |
| 7,296,188 | B2 * | 11/2007 | Paternostro et al. | 717/124 |
| 7,996,819 | B2 | 8/2011 | Okada | |
| 8,095,636 | B2 | 1/2012 | Linville et al. | |
| 2004/0128652 | A1 * | 7/2004 | Mandava et al. | 717/124 |
| 2007/0094541 | A1 | 4/2007 | Kang | |
| 2009/0249297 | A1 | 10/2009 | Doshi et al. | |
| 2009/0254329 | A1 | 10/2009 | Thakkar | |
| 2009/0288072 | A1 * | 11/2009 | Kania | 717/131 |
| 2009/0300423 | A1 * | 12/2009 | Ferris | 714/38 |
| 2010/0235807 | A1 * | 9/2010 | Doddappa et al. | 717/101 |
| 2011/0123973 | A1 | 5/2011 | Singh | |
| 2012/0079457 | A1 * | 3/2012 | Makey et al. | 717/124 |
| 2012/0204153 | A1 * | 8/2012 | Peterson et al. | 717/124 |

OTHER PUBLICATIONS

Liu, Dan, and Chuck Berry. "Integrate Rational Team Concert and Rational Performance Tester for collaborative script development, version control, and process management." developerWorks. IBM, Nov. 5, 2009. Web. Jul. 22, 2014. <http://www.ibm.com/developerworks/rational/library/09/integraterationalteamconcertandrationalperformancet.*
IBM Corporation, "GUI Automation Test System: Automatically Generate Efficient, Accurate, Robust Test Scripts for a Web Application," IP.com, Jan. 14, 2010, pp. 1-4.
IBM Corporation, "Method to Design and Develop Intelligent Automation Test Scripts," IP.com, May 7, 2009, pp. 1-9.
Shruti Grover, IBM Corporation, "Make Test Automation Scripts Domain-Independent So They are Reusable," Mar. 27, 2012, pp. 1-9.
IBM Corporation, Method to Convert or Migrate GUI Test Automation Scripts from One Tool to Another Tool, Feb. 21, 2006, pp. 1-2.

* cited by examiner

*Primary Examiner* — Wei Zhen
*Assistant Examiner* — Binh Luu
(74) *Attorney, Agent, or Firm* — Holland & Knight LLP; Brian J. Colandreo, Esq.; Jeffrey T. Placker, Esq.

(57) ABSTRACT

A method, computer program product, and system for testing software applications. An API configured to allow composition of a test script in a format not associated with a specific tool for automated testing is provided, the test script including one or more actions for testing a software application. The one or more actions are mapped to one or more methods included in a code repository, the one or more methods being configured to utilize a first native API associated with the specific tool for automated testing. The one or more methods and the first native API are utilized to test the application using the specific tool for automated testing.

17 Claims, 4 Drawing Sheets

TOOL-INDEPENDENT AUTOMATED TESTING OF SOFTWARE

TECHNICAL FIELD

This disclosure relates to testing software applications.

BACKGROUND

It may be useful in certain instances to execute various automated testing of software applications. Automated testing may be the use of computer programming to execute testing of software applications that might otherwise need to be performed manually. In certain instances, automated software testing may be applied to only certain aspects of a software application (i.e., to a portion of the application). Automated tests may, in certain instances, be modified and/or repeated on the same or different software applications (and/or aspects of software applications). Automated software testing may sometimes utilize particular test automation tools, which may be designed to address one or more particular test environments, frameworks, application types, programming languages, and so on.

BRIEF SUMMARY OF THE DISCLOSURE

According to one aspect of the disclosure, a computer-implemented method includes providing, by one or more computing devices, an API configured to allow composition of a test script in a format not associated with a specific tool for automated testing, the test script including one or more actions for testing a software application. The method includes mapping, by the one or more computing devices, the one or more actions to one or more methods included in a code repository, the one or more methods being configured to utilize a first native API associated with the specific tool for automated testing. The method includes utilizing, by the one or more computing devices, the one or more methods and the first native API to test the software application using the specific tool for automated testing.

One or more of the following features may be included. The method may include providing an execution record associated with the test of the software application using the specific tool for automated testing. The method may include maintaining version control with respect to the test script. The method may include selecting the specific tool for automated testing based upon, at least in part, a subscription service associated with the specific tool for automated testing, wherein one or more of the specific tool for automated testing and the software application are hosted on a software as service layer in a cloud computing system. The method may include mapping the one or more actions included in the test script to one or more other methods included in the code repository, the one or more other methods being configured to utilize a second native API associated with a different tool for automated testing. The method may include utilizing the one or more other methods and the second native API to test the software application using the different tool for automated testing. The method may include generating a comparative analysis of testing the software application using the specific tool for automated testing and testing the applications using the different tool for automated testing.

The method may include identifying a failure in utilizing the one or more methods and the first native API to test the software application using the specific tool for automated testing, wherein the failure is associated with the one or more actions. The method may include mapping the one or more actions to one or more other methods included in the code repository, the one or more other methods being configured to utilize a second native API associated with a different tool for automated testing, wherein the mapping is based upon, at least in part, identifying the failure. The method may include utilizing the one or more other methods and the second native API to test the software application using the different tool for automated testing.

According to another aspect of the disclosure, a computer program product resides on a computer readable storage medium that has a plurality of instructions stored on it. When executed by a processor, the instructions cause a processor to perform operations including providing an API configured to allow composition of a test script in a format not associated with a specific tool for automated testing, the test script including one or more actions for testing a software application. The operations include mapping the one or more actions to one or more methods included in a code repository, the one or more methods being configured to utilize a first native API associated with the specific tool for automated testing. The operations include utilizing the one or more methods and the first native API to test the software application using the specific tool for automated testing.

One or more of the following features may be included. The operations may include providing an execution record associated with the test of the software application using the specific tool for automated testing. The operations may include maintaining version control with respect to the test script. The operations may include selecting the specific tool for automated testing based upon, at least in part, a subscription service associated with the specific tool for automated testing, wherein one or more of the specific tool for automated testing and the software application are hosted on a software as service layer in a cloud computing system. The operations may include mapping the one or more actions included in the test script to one or more other methods included in the code repository, the one or more other methods being configured to utilize a second native API associated with a different tool for automated testing. The operations may include utilizing the one or more other methods and the second native API to test the software application using the different tool for automated testing. The operations may include generating a comparative analysis of testing the software application using the specific tool for automated testing and testing the applications using the different tool for automated testing.

The operations may include identifying a failure in utilizing the one or more methods and the first native API to test the software application using the specific tool for automated testing, wherein the failure is associated with the one or more actions. The operations may include mapping the one or more actions to one or more other methods included in the code repository, the one or more other methods being configured to utilize a second native API associated with a different tool for automated testing, wherein the mapping is based upon, at least in part, identifying the failure. The operations may include utilizing the one or more other methods and the second native API to test the software application using the different tool for automated testing.

According to another aspect of the disclosure, a computing system includes one or more processor devices and one or more memory architectures coupled with the one or more processor devices. The one or more processor devices are configured to provide an API configured to allow composition of a test script in a format not associated with a specific tool for automated testing, the test script including one or more actions for testing a software application. The one or more processor devices are configured to map the one or more actions to one or more methods included in a code repository, the one or more methods being configured to utilize a first native API associated with the specific tool for automated testing. The one or more processor devices are configured to utilize the one or more methods and the first native API to test the software application using the specific tool for automated testing.

One or more of the following features may be included. The one or more processor devices may be configured to provide an execution record associated with the test of the software application using the specific tool for automated testing. The one or more processor devices may be configured to maintain version control with respect to the test script. The one or more processor devices may be configured to select the specific tool for automated testing based upon, at least in part, a subscription service associated with the specific tool for automated testing, wherein one or more of the specific tool for automated testing and the software application are hosted on a software as service layer in a cloud computing system. The one or more processor devices may be configured to map the one or more actions included in the test script to one or more other methods included in the code repository, the one or more other methods being configured to utilize a second native API associated with a different tool for automated testing. The one or more processor devices may be configured to utilize the one or more other methods and the second native API to test the software application using the different tool for automated testing. The one or more processor devices may be configured to generate a comparative analysis of testing the software application using the specific tool for automated testing and testing the applications using the different tool for automated testing.

The one or more processor devices may be configured to identify a failure in utilizing the one or more methods and the first native API to test the software application using the specific tool for automated testing, the failure associated with the one or more actions. The one or more processor devices may be configured to map the one or more actions to one or more other methods included in the code repository, the one or more other methods being configured to utilize a second native API associated with a different tool for automated testing, wherein the mapping is based upon, at least in part, identifying the failure. The one or more processor devices may be configured to utilize the one or more other methods and the second native API to test the software application using the different tool for automated testing.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

Figure 1:
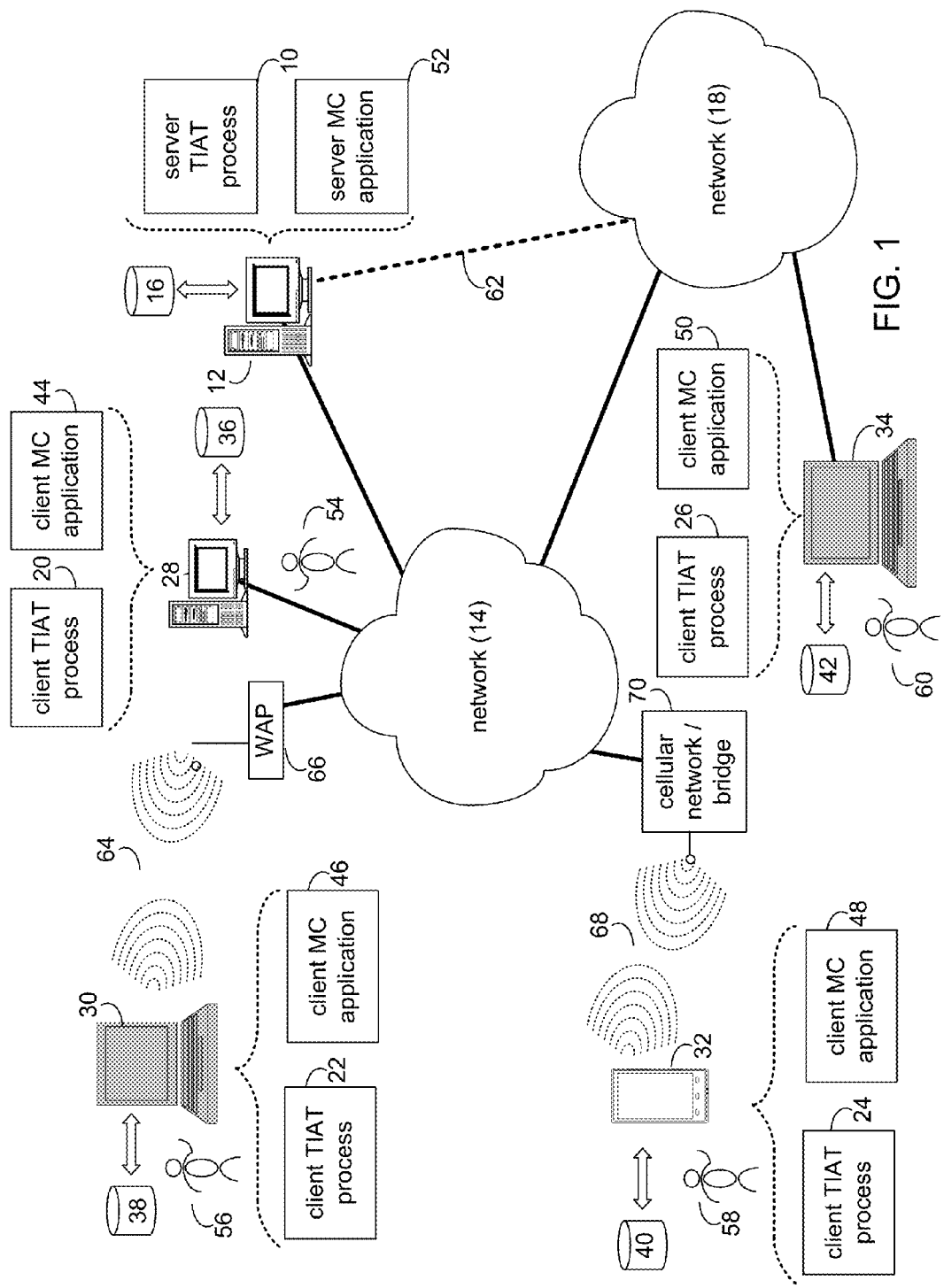
FIG. 1 is a diagrammatic view of a tool-independent automated testing process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It may be useful in certain instances to perform automated testing of software applications. Automated testing may include the use of computer programming to automatically (and/or quasi-automatically) execute testing of software applications that might otherwise need to be performed manually (and/or quasi-manually). Automated software testing may sometimes utilize particular test automation tools ("TATs"), which may be designed to address a particular test environment, application type, application language, and so on.

Because of the variety of potential TATs and the potential differences between them, it may be difficult at times for a user (or team of users) to effectively select and employ the most appropriate TAT(s) for an automated testing plan. For example, although certain TATs may facilitate testing of certain functionality, while other TATs may not, various TATs may require particularized knowledge on the part of users in order for the users to compose test scripts for the TATs in the appropriate format (e.g., script syntax, lexicon, structure, and so on). (As noted above, the format required for test scripts for a particular TAT may vary considerably from the format required for test scripts for a different TAT.) Accordingly, it may be useful to provide a process (or application and so on) through which a user may compose test scripts for a software application to be tested (i.e., an "application under test" or "AUT") using a standardized format not associated with any particular TAT. In some embodiments, such test scripts composed using a standardized format may be applied to one TAT, or a plurality of different TAT's, e.g., that may require test scripts in different formats. As such, in some embodiments, such a test script composed using a standardized format may be utilized (e.g., after various transformations, such as mapping of test script logic to TAT-specific methods) for conducting automated (and/or quasi-automated) testing of software using different TAT's. In certain embodiments, a tool-independent automated testing ("TIAT") process (or application) may address these and other issues.

Referring now to FIG. 1, a TIAT process may be coupled to a computer or computer network. For example, server TIAT process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server® Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server TIAT process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademarks of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client TIAT processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CE®, Red Hat® Linux®, or a custom operating system.

The instruction sets and subroutines of client TIAT processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives;

tape drives; optical drives; RAID arrays; random access memories (RAM); read-only memories (ROM); compact flash (CF) storage devices; secure digital (SD) storage devices; and memory stick storage devices.

In an embodiment, the TIAT process may be a server-side process (e.g., which may be implemented via server TIAT process 10), in which all of the functionality of the TIAT process may be executed on a server computer (e.g., server computer 12). In an embodiment, the TIAT process may be a client-side process (e.g., which may be implemented via one or more of client TIAT processes 20, 22, 24, 26), in which all of the functionality of the TIAT process may be executed on a client computing device (e.g., one or more of client electronic devices 28, 30, 32, 34). In an embodiment, the TIAT process may be a hybrid server-client process (e.g., which may be implemented by server TIAT process 10 and one or more of client TIAT processes 20, 22, 24, 26), in which at least a portion of the functionality of the TIAT process may be implemented via server computer 12 and at least a portion of the functionality of the TIAT process may be implemented via one or more client computing devices (e.g., one or more of client electronic devices 28, 30, 32, 34).

In certain embodiments, a TIAT process may be a stand-alone process. In certain embodiments, a TIAT process may operate as part of, or in conjunction with, one or more other processes and/or may include one or more other processes. For example, in certain embodiments, a TIAT process may be included in (or may operate in conjunction with) a automated test management console ("MC") application (or process), which may generally facilitate management of test scripts and other aspects of automated testing and/or a scripting engine application (or process) (not shown).

An MC application (or process) may operate (and/or reside) on a client device (e.g., client MC application 44, operating on client electronic device 28; client application MC 46, operating on client electronic device 30; client MC application 48, operating on client electronic device 32; or client MC application 50, operating on client electronic device 34). A client TIAT process (e.g., client TIAT process 20) or a server TIAT process (e.g., server TIAT process 10) may be in communication with a client MC application (e.g., client MC application 44) or may be part of a client MC application.

An MC application may additionally/alternatively operate (and/or reside) on a server device (e.g., server MC application 52, operating on server computer 12 or another server MC application (not shown), operating on another server computer (not shown)). A server TIAT process (e.g., server TIAT process 10) or a client TIAT process (e.g., client TIAT process 20) may be in communication with a server MC application (e.g., server MC application 52) or may be a part of a server MC application.

A scripting engine application (or process) (not shown) may operate (and/or reside) on a client device (e.g., client electronic device 28; client electronic device 30; client electronic device 32; or client electronic device 34). A client TIAT process (e.g., client TIAT process 20) or a server TIAT process (e.g., server TIAT process 10) may be in communication with a client scripting engine application or may be part of a client scripting engine application.

A scripting engine application (or process) (not shown) may additionally/alternatively operate (and/or reside) on a server device (e.g., server computer 12 or another server computer (not shown)). A server TIAT process (e.g., server TIAT process 10) or a client TIAT process (e.g., client TIAT process 20) may be in communication with a server scripting engine application or may be a part of a server scripting engine application.

Users 54, 56, 58, 60 may access a TIAT process in various ways. For example, these users may access server TIAT process 10 directly through the device on which a client process (e.g., client TIAT processes 20, 22, 24, 26) is executed, namely client electronic devices 28, 30, 32, 34. Users 54, 56, 58, 60 may access server TIAT process 10 directly through network 14 and/or through secondary network 18. Further, server computer 12 (i.e., the computer that executes server TIAT process 10) may be connected to network 14 through secondary network 18, as illustrated with phantom link line 62. Users 54, 56, 58, 60 may also access a client or server MC application (or process) and/or a client or server webpage rendering and/or content management system (or application or process) in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client TIAT process 20 will be described for illustrative purposes. It will be understood that client TIAT process 20 may, for example, interact and/or communicate with a server TIAT process such as server TIAT process 10 and/or may be executed within one or more applications that allow for communication with other server and/or client TIAT processes. This is not intended to be a limitation of this disclosure, as other configurations are possible (e.g., TIAT process 20 may include stand-alone client processes and/or stand-alone server processes). For example, some implementations may include one or more of client TIAT processes 22, 24, 26 or server TIAT process 10 in place of or in addition to client TIAT process 20.

Figure 2:
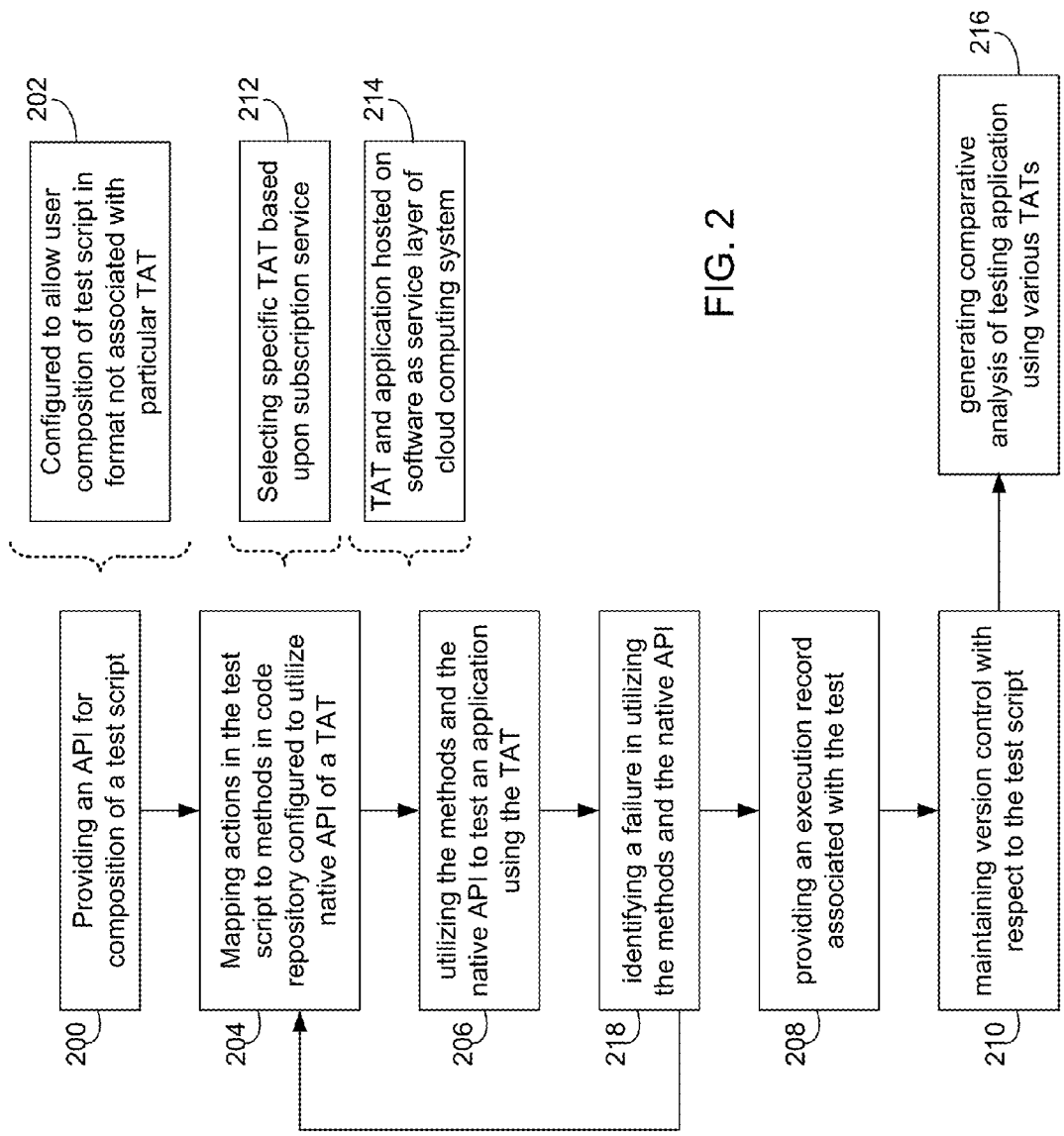
FIG. 2 is a flowchart of a process executed by the tool-independent automated testing process of FIG. 1.

Referring now also to FIG. 2, there is shown a diagrammatic view of an example process that may be implemented by a TIAT process, e.g., client TIAT process 20. Client TIAT process 20 may provide 200 an API. For example, Client TIAT process 20 may provide 200 an API to a user. In certain embodiments, for example, the API may be provided 200 as a .jar file. It will be understood that a .jar file may be an archive file format utilized to aggregate various class files and associated information, often for the distribution of Java application software or libraries. In certain embodiments, such a .jar file may be imported into any suitable Java environment for use by a user or team of users.

The provided 200 API may be configured 202 to allow composition (e.g., by a user) of a test script for automated testing of a software application, using a format (e.g., syntax, lexicon, code structure, and so on) that is not associated with any particular tool for automated testing. It will be understood that a tool for automated testing (a "TAT") may be designed to operate with respect to a particular test environment, such as a particular proprietary application or application suite, a particular operating system, a particular language (e.g., HTML) and so on. Accordingly, it may be useful to provide 200 a standardized or generic API (i.e., an API configured 202 to allow composition of a test script in a standardized or generic, rather than TAT-specific, format) in order to facilitate users composing test scripts without necessarily amassing a certain expertise with respect to the format and so on of a particular TAT. The provided 200 API may be configured to some or all of the typical features/operations provided by various TATs and/or various unique features/operations specific to one or more particular TATs.

It will be understood that TATs may take various forms and that certain TATs may exhibit different support, functionality, features, and/or operations than others. For example, one TAT—e.g., QuickTest® Professional (QTP)—may not support certain frameworks that may be supported by another TAT—e.g., Rational® Function Tester (RFT). (QuickTest is a registered trademark of Hewlett-Packard Development Company, L.P. in the United States, other countries, or both. Rational is a registered trademark of International Business Machine Corp. in the United States, other countries, or both.) Similarly certain other TATs—e.g., Selenium—may provide the same and/or different functionality/support/etc. as these (and/or other) TATs.

In certain embodiments, the provided 200 API may be configured 202 to support a variety of operations facilitated by (and/or features provided by) a variety of TATs (i.e., various general automated testing functionality). In certain embodiments, the provided 200 API may be configured 202 to support various operations facilitated by (and/or features provided by) a specific TAT (i.e., operations/features that are unique to a particular TAT). In this way, for example, such a provided 200 API may facilitate a user composing test scripts embodying functionality/operations/features/etc. that may be associated with a variety of TATs, even if the user does not have a certain level of familiarity/expertise with respect to a particular TAT included in the supported variety of TATs.

Such features/operations/etc. may be utilized by a user through the encoding of various actions into the test script using the provided 200 API. As used herein, "actions" may refer to various test functionality, test steps, test actions, and so on, that a user may wish to implement as part of an automated test of one or more software applications. Accordingly, a user may include one or more such actions in the test script composed using the provided 200 API.

The user may provide the test script to (i.e., the test script may be received by) a management console ("MC") application (or process). An MC may represent a test management application that may be used for administrative activities with regard to one or more automated tests. For example, a user may check a test script, composed using the provided 200 API, into the MC and may then control (to varying degrees) when, where, and how the script may be executed. The MC may interpret the test script (e.g., internally or by passing the test script to another process or application, such as a scripting engine application) and may insert into a test template various methods (e.g., various algorithms, commands, and so on) that may correspond to the functionality of various actions (and/or various components of various actions) and which may be associated with one or more particular TATs. In this way, for example, the MC (e.g., internally or by utilizing another process or application, such as a scripting engine) may convert (or cause to be converted) various actions of the test script (i.e., various test functionality, and so on), which may not have been composed using a format associated with a particular TAT (e.g., because the test script may be composed using the provided 200 API), into a corresponding set of methods that are associated with a particular TAT (or TATs). As also noted above, it will be understood that TIAT process 20 may interoperate with an MC, and/or may be part of an MC (and vice versa).

Continuing the above example, in certain embodiments, TIAT process 20 (e.g., via an MC application and/or a scripting engine application) may map 204 one or more actions included in the user-composed test script to one or more methods included in a code repository, wherein the methods to which the actions are mapped may be configured to utilize a native API associated with a specific TAT. For example, a code repository may contain various functional implementations of particular test methods, each of which may correspond to an action (or actions) that may be encoded by a user using the provided 200 API. In order to facilitate testing of an application under test (an "AUT") using the encoded actions (which may, for example, not be formatted to utilize a particular TAT), TIAT process 20 may accordingly map 204 one or more of the encoded actions to one or more methods in the code repository. Because the methods of the code repository may be associated with a particular native API for a particular TAT, such mapping 204 of the (generically) formatted actions to TAT-specific (or TATs-specific) methods may accordingly facilitate the use of one or more particular TATs to test an AUT, as informed by the encoded actions.

It will be understood that in certain embodiments, mapping 204 actions to methods in a code repository may not necessarily include one-to-one mapping. For example, the focus of mapping 204 may be on creating a functionally equivalent test script for a particular TAT, based upon the actions encoded using the provided 200 API. Accordingly, TIAT process 20 may, for example, utilize one or more wrapper libraries in order to map a particular action to one or more methods (and/or vice versa) in order to represent the test logic of the encoded actions through the mapped 204 methods. In this way, as also noted above, for example, TAI process 20 may facilitate the use of various specific TATs to implement various test logic (e.g., as encoded in various actions) even though the user composing the test scripts (which instantiate the test logic) may not have a certain level of expertise with regard to one or more of the specific TATs.

Mapping 204 actions to methods may be achieved using a variety of means, including, for example, through a scripting engine. In certain embodiments, a scripting engine may interoperate with and/or may be a part of an MC application (or process) and vice versa. For example, in certain embodiments, an MC application may receive test scripts from a user (i.e., test scripts composed using the provided 200 API) and may pass the test scripts to a scripting engine. The scripting engine may then functionally interpret various actions in the test scripts and convert these actions into a functionally equivalent test script (e.g., by mapping 204 the actions appropriate methods) that may be able to run on a particular TAT.

TIAT process 20 may utilize 206 such methods (i.e., as may be determined from mapping 204 one or more actions) to test an AUT using a particular TAT. For example, a user may utilize the provided 200 API to compose a particular test script including a particular action representing a particular testing logic. TIAT process 20 may map 204 the action to a particular method (or methods) associated with a particular TAT (and/or particular set of TATs), such as a TAT specified by a user. TIAT process 20 may further utilize 206 the mapped 204 method (which may utilize a native API associated with the particular TAT) to test the AUT using the particular TAT. In this way, for example, TIAT process 20 may facilitate a user executing a particular test logic on an AUT using a particular TAT, even though the user may not have familiarity with the practical implementation of test logic through that particular TAT.

For example, continuing the discussion above, a scripting engine may transfer a TAT-specific test script (i.e., a script implementing appropriate methods determined based upon mapping 204 actions of the user-composed test script) to a server associated with the specific TAT (e.g., through SSH protocols), in order to facilitate execution of the script on the specific TAT.

In certain embodiments, TIAT process 20 may provide 208 an execution record (e.g., as part of an execution report) relating to the testing of the AUT using the particular TAT. In this way, for example, TIAT process 20 may provide 208 useful information regarding the particular test (e.g., whether the test revealed an issue, whether the test was successful, whether the test failed, various details of the implementation of the test, and so on). In an embodiment, TIAT process 20 may provide 208 the execution record to a user, e.g., in a user consumable format (e.g., a text-based document, or the like). In certain embodiments, a user may be provided 208 various execution records and/or reports via an MC application (or process).

In certain embodiments, TIAT process 20 (e.g., through an MC application) may maintain 210 version control with respect to a test script. For example, in certain embodiments a user may edit a previously-created test script to include different, modified, and/or other functionality, test logic, and so on (i.e., to include potentially different actions). In certain embodiments, however, certain actions included in a test script may not have been changed, even though other aspects of the test script have been changed. It may be useful, therefore, for example, to determine whether certain actions of a particular test script have already been mapped 204 to particular methods and need not be mapped 204 again in order to facilitate the use of a particular TAT. For example, when old and/or un-edited actions in an otherwise modified test script have already been mapped to methods in a code repository, it may save time, computing resources, and so on, if only new and/or edited actions in that test script are mapped 204 in the creation of an updated TAT-specific test script. TIAT process 20 may, for example, facilitate this efficiency by maintaining 210 version control with respect to test scripts, thereby maintaining a record of changes that have been made to test scripts. In this way, for example, mapping 204 of actions to methods may need to occur only once (or a minimum number of times) for a given action, script, method, and/or TAT, and so on.

A user may identify a specific TAT to be used in testing (i.e., in implementation of various encoded actions) in a variety of ways. In certain embodiments, for example, a user may actively select a particular TAT (or TATs) and/or may establish pre-set preferences specifying a particular TAT (or TATs). In certain embodiments, TIAT process 20 may select 212 a specific TAT for testing of an AUT based upon, at least in part, a subscription service associated with the specific TAT. For example, various TATs (including the specific TAT) and/or the AUT may be hosted on cloud computing system 214 on a software as service layer. Accordingly, TIAT process 20 may select a specific TAT (e.g., to inform the mapping 204 of actions to methods included in the code repository) based upon a user having an up-to-date subscription to the specific TAT and therefore being authorized to utilize that TAT to test the AUT. (It will be understood that various other aspects of a TIAT process 20 and/or related processes or applications may also be hosted on cloud computing system 214. For example, the management console may be hosted as a service layer, and may also be available through subscription. Similarly, TAT-specific code repositories may be available as plug-ins, also based upon user subscription.)

In certain embodiments, TIAT process 20 may map 204 one or more actions to multiple methods (or sets of methods) included in the code repository, which may be respectively associated with multiple TATs. For example, TIAT process 20 may map 204 a particular action to a first method (or set of methods) associated with a first TAT and may also map 204 the particular action to a second method (or set of methods) associated with a second TAT. In this way, for example, TIAT process 20 may facilitate the use of multiple TATs (e.g., the first and second TATs noted above) to implement the test logic represented by a particular action (or set of actions).

In certain embodiments, TIAT process 20 may generate 216 a comparative analysis of testing the AUT using two or more different TATs. For example, as noted above, TIAT process 20 may, in certain embodiments, map 204 an action representing certain test logic to a first set of methods associated with a first TAT and may also map 204 the action to a second set of methods associated with a second TAT. Further, TIAT process 20 may utilize 206 each of the TATs to implement the test logic in a test of the AUT (e.g., in separate automated tests of the AUT using the separate TATs). Due to the variation and subtleties of AUTs, TATs, test logic, mapping 204, and other aspects of TIAT process 20 and/or automated software application testing, in certain embodiments use of one TAT (e.g., the first TAT) may result in a more effective, efficient, and/or otherwise favorable test than use of another TAT (e.g., the second TAT). Accordingly, it may be useful to generate 216 a comparison of testing that implements the same (or similar) encoded test actions using a variety of TATs.

As noted above, in certain embodiments, a user may be permitted the use of a particular TAT as part of a subscription service in a cloud computing system. It will be understood, however, that TIAT process 20 need not be limited to using only TATs for which a particular user has a subscription. For example, it may be useful, in certain embodiments, to map 204 actions to methods associated with a TAT for which a user does not have a subscription, but which may be particularly suitable to the type of testing to be done, the type of AUT and so on (e.g., as determined based upon analysis of past execution of similar testing on similar AUTs). It may also be useful, in such an embodiment, to generate 216 a comparative analysis of such a TAT and, for example, a TAT for which the user does have a subscription. In this way, for example, if a non-subscription TAT may result in a more effective, inexpensive, and so on execution of particular test logic than a subscription TAT, TIAT process 20 may alert a user to this fact by mapping 204 actions to methods for both TATs, providing 208 execution records only for the subscription TAT, and also generating 216 and presenting to the user, a comparative analysis of the performance (and/or other aspects) of the use of both TATs.

TIAT process 20 may, in certain embodiments, identify 218 a failure in utilizing the one or more methods and/or the first native API to test an AUT using a specific TAT. In certain embodiments, for example, the failure may be associated with one or more actions encoded by the user using the provided 200 API and/or may be associated with various mapped 204 methods and/or the native API. For example, a particular action, which may have been mapped 204 to a particular method, which may utilize the native API of the specific TAT, may represent particular test logic. Accordingly, the method(s) to which the action may be mapped 204 may represent functionally similar test logic. In certain embodiments, this test logic may fail to execute properly when the specific TAT is used to test the AUT (e.g., because of a flaw in the mapping 204 of the action to the method(s), because of an incompatibility between the test logic or other factor with the TAT and/or the AUT, because of a flaw in the action(s) or method(s), and so on). Accordingly, TIAT process 20 may identify 218 such a failure and may identify various parameters associated with the failure.

Based upon identifying 218 such a failure, TIAT process 20 may accordingly map 204 the one or more actions previously mapped to methods associated with the specific TAT to one or more other methods included in the code repository, wherein the one or more other methods may be configured to utilize a native API associated with a different TAT (including, for example, a TAT to which a user does not have a subscription). TIAT process 20 may select the different TAT in a variety of ways. For example, TIAT process 20 may select the different TAT based upon analysis of a pattern of past failures (e.g., actions/methods that fail with respect to a particular TAT may tend, historically, to not fail with respect to a particular other TAT). TIAT process 20 may then utilize 206 the one or more other methods and the native API associated with the different (i.e., the alternate) TAT to test the AUT using the different TAT. In this way, for example, TIAT process 20 may provide for alternative testing of an AUT (i.e., may utilize 206 various TATs to test an AUT) in response to identifying 218 a failure in testing the AUT (in accordance with various encoded actions) using a particular TAT.

As also noted above, in certain embodiments, a user may be able to utilize TIAT process 20 to implement testing of a particular AUT using a variety of TATs, even if the user may not be adequately familiar with the necessary format for composing scripts for one or more of the TATs. For example, a test team may wish to create an automation test script to (1) set a username, (2) set a password, and (3) "click" to submit the username and password. Accordingly, the team may utilize the provided 200 API to create their own breadcrumb and may write the following illustrative example test script:

```
Object User
{
    Control.CreateTextBox(2);
    Operation.text("Username");
    Operation.click(na);
}
Object Password
{
    Control.CreateTextBox(1);
    Operation.text("pwd123");
}
Object login
{
    Control.CreateButton(1);
    Operation.click(na);
}
```

Notably, in certain embodiments, the test team may not need to record any objects and/or browse through the properties of any object associated with the AUT and/or the test they wish to implement. For example, because TIAT process 20 may generate objects dynamically at runtime instead of recording (or requiring them to be recorded) beforehand, the test team may need only to utilize the text as seen on the screen for the particular AUT in order to prepare an appropriate breadcrumb.

The test team may upload the <<login>> test script above to an MC application and may provide configuration information such as which TAT is to be utilized to execute the test logic of the test script (e.g., a TAT to which the test team has a subscription or a TAT that the test team wishes to evaluate in the interest of obtaining a subscription). The MC application may then forward the <<login>> test script to a scripting engine, which may interpret the script and generate (i.e., through mapping 204 actions to methods in a code repository) a functionally equivalent test script specific to the selected (and/or another) TAT. This equivalent script may then be executed on the TAT in order to test the AUT using the test logic represented by the test script.

For example, if the test team has specified (e.g., by a subscription or otherwise) that RFT is to be utilized, the functionally equivalent test script may appear as:

```
RootTestObject parent=getRootTestObject ( );
WTextField User_TextBox=new WTextField (parent, "user");
WTextField password_TextBox=new WTextField(parent, "password");
WButton submit_Button=new WButton (parent, "submit");
User_TextBox.setText("Username");
password_TextBox.setText("pwd123");
submit_Button.click( );
```

As noted above, this test script may, for example, be generated based upon mapping 204 actions in the user-composed test script to methods associated with RFT and stored in a code repository. For example, the code repository for RFT may include wrapper methods for the RFT API, which may facilitate appropriate mapping 204 of user-composed test actions.

If, for example, the test team (and/or TIAT process 20) instead selects QTP for execution of the <<login>> test, the scripting engine may utilize a code repository associated with QTP in order to map 204 actions in the user-composed test script to methods that may be utilized to generate a functionally equivalent test script for QTP. Such a code repository may accordingly, for example, include the appropriate methods to dynamically create objects at runtime for QTP using the information (e.g., the actions) provided in the user-composed script.

Figure 3:
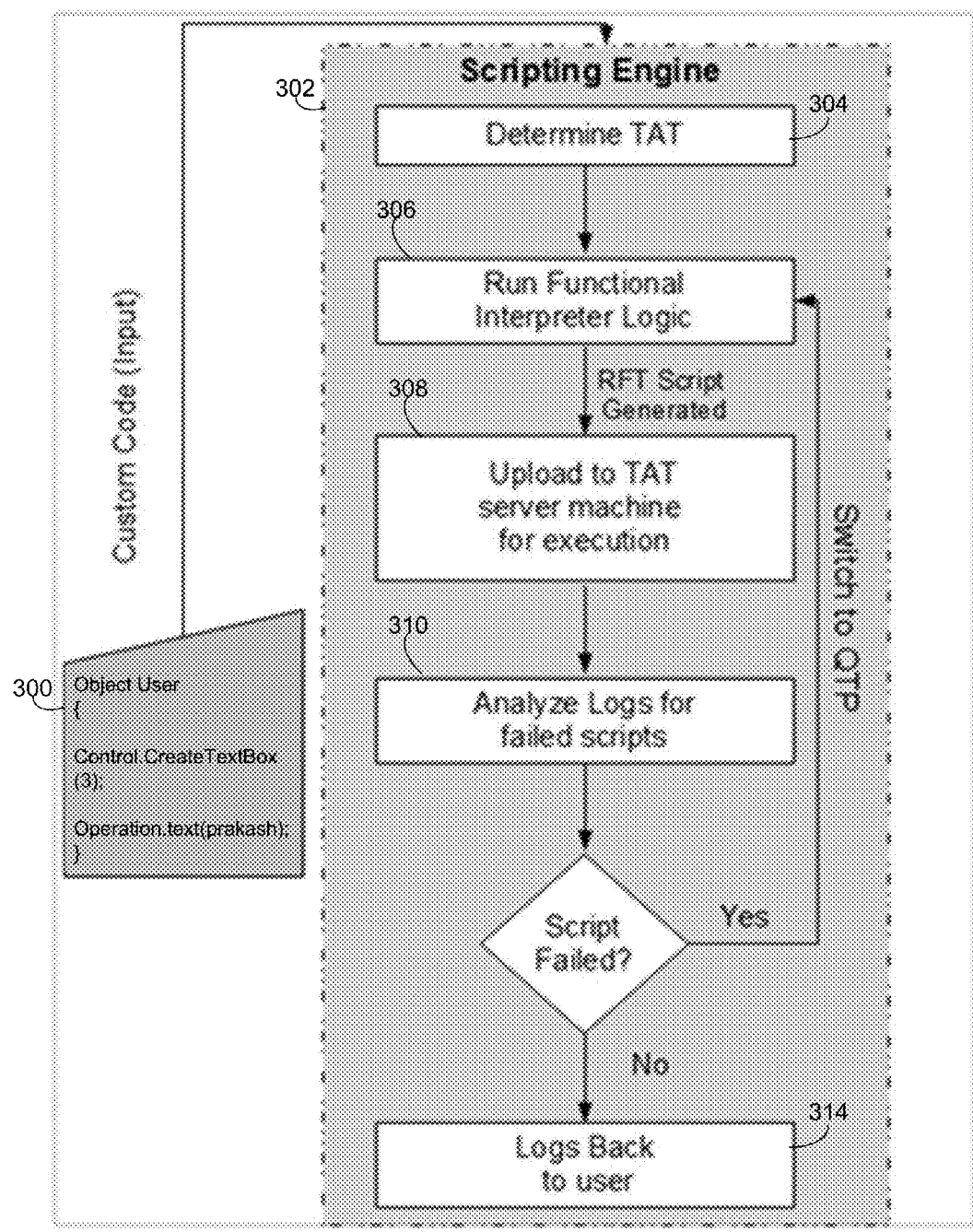
FIG. 3 is an example flowchart of a process executed by the tool-independent automated testing process of FIG. 1.

Referring now also to FIG. 3, an example implementation of an aspect of TIAT process 20 is depicted. For example, a user may compose test script 300 (i.e., using a provided 200 API), which may be passed to scripting engine 302 (e.g., as part of and/or by way of an MC application). Scripting engine 302 may determine 304 a particular TAT to be utilized (e.g., based upon a user selection, a subscription service, and/or other factors). For example, scripting engine 302 may determine 304 that RFT will be utilized. Accordingly, scripting engine 302 may run 306 interpreter logic in order to map 204 various actions of test script 300 to methods (e.g., in a code repository) that are associated with RFT, thereby generating an RFT-compatible test script that may be functionally equivalent to the actions of test script 300. The RFT script may then be uploaded 308 to a TAT server machine (e.g., a machine associated with RFT testing) for execution, after which scripting engine 302 may analyze execution records to identify 218 any failures in the test. If no failure is detected, scripting engine 302 may facilitate providing 314 execution logs/records to the user. If a failure is identified 218, however, the scripting engine may re-run 306 interpreter logic in order to map 204 actions of test script 300 to methods (e.g., in a code repository) that are associated with QTP (and/or another alternative TAT), thereby generating a QTP-compatible script that may be functionally equivalent to the actions of test script 300. The QTP script may then be uploaded 308 to a TAT server machine (e.g., a machine associated with QTP testing) for execution, after which scripting engine 302 may again analyze execution records to identify 218 any failures in the test, and so on.

Figure 4:
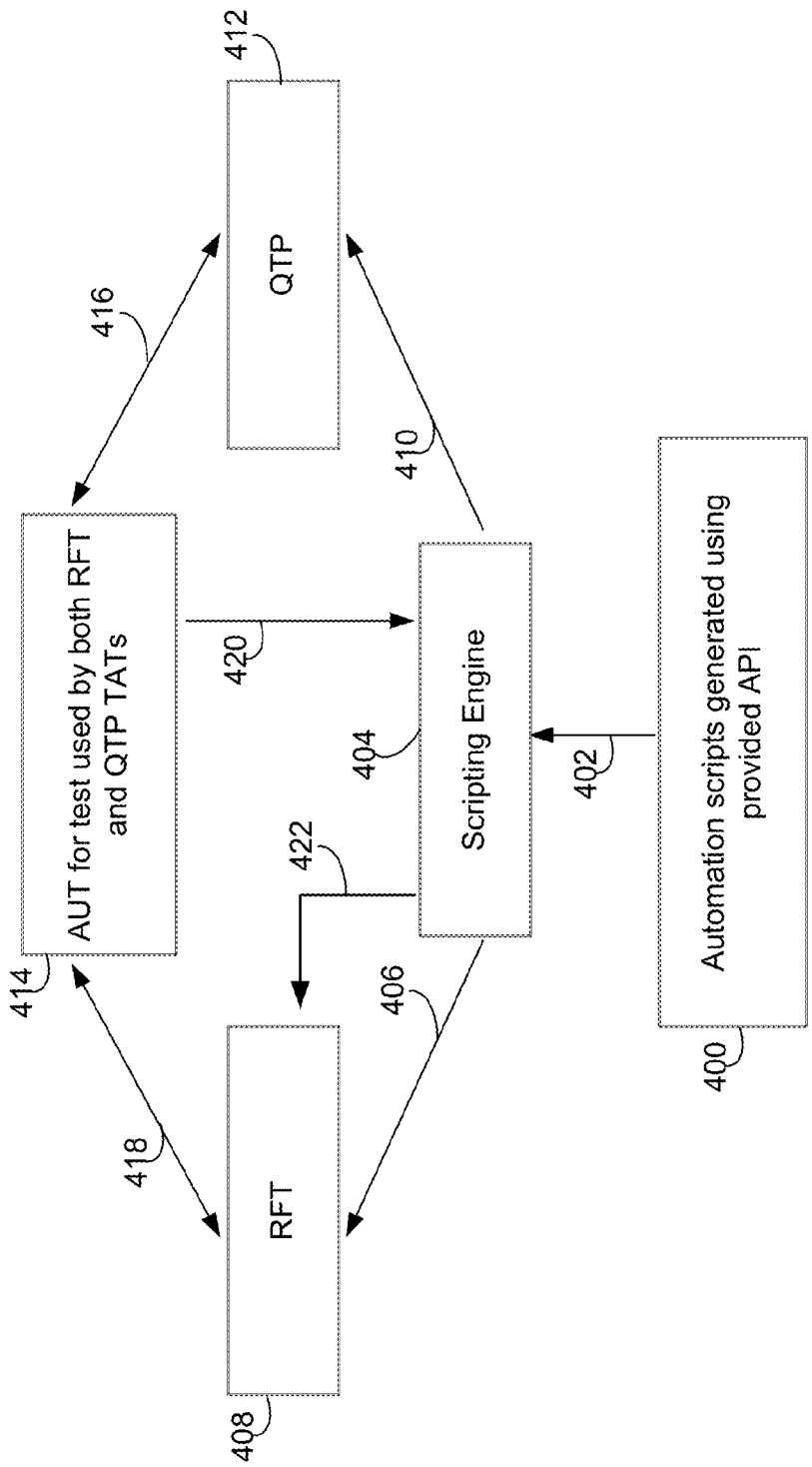
FIG. 4 is a diagrammatic view of an aspect of the tool-independent automated testing process of FIG. 1.

Referring now also to FIG. 4, an example implementation of an aspect of TIAT process 20 is depicted, including mapping 204 of test script actions to alternative methods associated with an alternative TAT based upon, at least in part, identifying 218 a failure in testing the AUT. For example, a user may compose certain automation scripts 400 using the provided 200 API, which scripts 400 may include various actions associated with testing one or more AUTs. Scripts 400 may be provided 402 to scripting engine 404 (e.g., as part of and/or by way of an MC application), which may map 406 certain actions of scripts 400 to various methods configured to utilize TAT 408 (e.g., RFT) and may map 410 certain actions of scripts 400 to methods configured to utilize TAT 412 (e.g., QTP). A particular AUT (e.g., AUT 414) may then be tested 416, 418 using the mapped 410, 406 methods and TATs 408, 412 (e.g., RFT and QTP).

In certain embodiments, one of the tests corresponding to a particular test script (or portion of the test logic thereof) may fail. For example, one of the scripts mapped 410 to QTP may fail because it requires support for Adobe Flex®, which may not be provided through QTP (but which may be provided through RFT). (Adobe and Flex are registered trademarks of Adobe Systems Inc. in the United States, other countries, or both.) Accordingly, identifying 218 such a failure may cause 420 scripting engine 404 to remap 422 actions associated with the failed test to an alternative TAT (e.g., RFT). The failed test (and/or a portion thereof) may then be re-applied to AUT 414 using the alternative TAT (i.e., RFT).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
providing, by one or more computing devices, an API configured to allow composition of a test script in a format not associated with a specific tool for automated testing, the test script including one or more actions for testing a software application;
mapping, by the one or more computing devices, the one or more actions to one or more methods included in a code repository, the one or more methods being configured to utilize a first native API associated with the specific tool for automated testing;
utilizing, by the one or more computing devices, the one or more methods and the first native API to test the software application using the specific tool for automated testing;
identifying, by the one or more computing devices, a failure in utilizing the one or more methods and the first native API to test the software application using the specific tool for automated testing, wherein the failure is associated with the one or more actions;
mapping the one or more actions to one or more other methods included in the code repository, the one or more other methods being configured to utilize a second native API associated with a different tool for automated testing, wherein the mapping is based upon, at least in part, identifying the failure; and
utilizing the one or more other methods and the second native API to test the software application using the different tool for automated testing.

2. The computer-implemented method of claim 1 further comprising:
providing an execution record associated with the test of the software application using the specific tool for automated testing.

3. The computer-implemented method of claim 1 further comprising:
maintaining version control with respect to the test script.

4. The computer-implemented method of claim 1 further comprising:
selecting the specific tool for automated testing based upon, at least in part, a subscription service associated with the specific tool for automated testing, wherein one or more of the specific tool for automated testing and the software application being tested are hosted on a software as service layer in a cloud computing system.

5. The computer-implemented method of claim 1 further comprising:
mapping the one or more actions included in the test script to one or more other methods included in the code repository, the one or more other methods being configured to utilize a second native API associated with a different tool for automated testing; and
utilizing the one or more other methods and the second native API to test the software application using the different tool for automated testing.

6. The computer-implemented method of claim 5 further comprising:
generating a comparative analysis of testing the software application using the specific tool for automated testing and testing the applications using the different tool for automated testing.

7. A computer program product residing on a non-transitory computer-readable storage medium having a plurality of instructions stored thereon, which, when executed by a processor, cause the processor to perform operations comprising:
providing an API configured to allow composition of a test script in a format not associated with a specific tool for automated testing, the test script including one or more actions for testing a software application;
mapping the one or more actions to one or more methods included in a code repository, the one or more methods being configured to utilize a first native API associated with the specific tool for automated testing;
utilizing the one or more methods and the first native API to test the software application using the specific tool for automated testing;
identifying a failure in utilizing the one or more methods and the first native API to test the software application using the specific tool for automated testing, the failure associated with the one or more actions;
mapping the one or more actions to one or more other methods included in the code repository, the one or more other methods being configured to utilize a second native API associated with a different tool for automated testing, wherein the mapping is based upon, at least in part, identifying the failure; and
utilizing the one or more other methods and the second native API to test the software application using the different tool for automated testing.

8. The computer program product of claim 7 wherein the operations further comprise:
providing an execution record associated with the test of the software application using the specific tool for automated testing.

9. The computer program product of claim 7 wherein the operations further comprise:
maintaining version control with respect to the test script.

10. The computer program product of claim 7 wherein the operations further comprise:
selecting the specific tool for automated testing based upon, at least in part, a subscription service associated with the specific tool for automated testing,
wherein one or more of the specific tool for automated testing and the software application are hosted on a software as service layer in a cloud computing system.

11. The computer program product of claim 7 wherein the operations further comprise:
mapping the one or more actions included in the test script to one or more other methods included in the code repository, the one or more other methods being configured to utilize a second native API associated with a different tool for automated testing; and
utilizing the one or more other methods and the second native API to test the software application using the different tool for automated testing.

12. The computer program product of claim 11 wherein the operations further comprise:
generating a comparative analysis of testing the software application using the specific tool for automated testing and testing the applications using the different tool for automated testing.

13. A computer system comprising:
one or more processor devices; and
one or more memory architectures coupled with the one or more processor devices;
wherein the one or more processor devices are configured to:
provide an API configured to allow composition of a test script in a format not associated with a specific tool for automated testing, the test script including one or more actions for testing a software application;
map the one or more actions to one or more methods included in a code repository, the one or more methods being configured to utilize a first native API associated with the specific tool for automated testing;
utilize the one or more methods and the first native API to test the software application using the specific tool for automated testing;
identify a failure in utilizing the one or more methods and the first native API to test the software application using the specific tool for automated testing, the failure associated with the one or more actions;
map the one or more actions to one or more other methods included in the code repository, the one or more other methods being configured to utilize a second native API associated with a different tool for automated testing, wherein the mapping is based upon, at least in part, identifying the failure; and
utilize the one or more other methods and the second native API to test the software application using the different tool for automated testing.

14. The computer system of claim 13 wherein the processor devices are further configured to:
provide an execution record associated with the test of the software application using the specific tool for automated testing.

15. The computer system of claim 13 wherein the processor devices are further configured to:
maintain version control with respect to the test script.

16. The computer system of claim 15 wherein the processor devices are further configured to:
select the specific tool for automated testing based upon, at least in part, a subscription service associated with the specific tool for automated testing,
wherein one or more of the specific tool for automated testing and the software application are hosted on a software as service layer in a cloud computing system.

17. The computer system of claim 13 wherein the one or more processor devices are further configured to:
map the one or more actions included in the test script to one or more other methods included in the code repository, the one or more other methods being configured to utilize a second native API associated with a different tool for automated testing;

utilize the one or more other methods and the second native API to test the software application using the different tool for automated testing; and generate a comparative analysis of testing the software application using the specific tool for automated testing and testing the applications using the different tool for automated testing.

* * * * *